US009396916B2

(12) United States Patent
Gerhardt et al.

(10) Patent No.: US 9,396,916 B2
(45) Date of Patent: Jul. 19, 2016

(54) ELECTROKINETICALLY CONTROLLED CALIBRANT DELIVERY

(75) Inventors: Geoff C. Gerhardt, Millbury, MA (US); Keith Fadgen, Hope Valley, RI (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 14/004,236

(22) PCT Filed: Mar. 8, 2012

(86) PCT No.: PCT/US2012/028155
§ 371 (c)(1),
(2), (4) Date: Oct. 25, 2013

(87) PCT Pub. No.: WO2012/125381
PCT Pub. Date: Sep. 20, 2012

(65) Prior Publication Data

US 2014/0151541 A1 Jun. 5, 2014

Related U.S. Application Data

(60) Provisional application No. 61/451,664, filed on Mar. 11, 2011.

(51) Int. Cl.
*G01D 18/00* (2006.01)
*G12B 13/00* (2006.01)
(Continued)

(52) U.S. Cl.
CPC ............ *H01J 49/0009* (2013.01); *H01J 49/00* (2013.01); *H01J 49/04* (2013.01)

(58) Field of Classification Search
CPC ........ H01J 49/00; H01J 49/04; H01J 49/0009
USPC .............. 250/252.1, 281, 282, 288, 428, 285
See application file for complete search history.

(56) References Cited

U.S. PATENT DOCUMENTS 5,872,010 A 2/1999 Karger et al.
6,110,343 A 8/2000 Ramsey et al.
6,231,737 B1 5/2001 Ramsey et al.
(Continued)

OTHER PUBLICATIONS

Wang et al.; An integrated micropump and electrospray emitter system based on porus silica monoliths, Electrophoresis 2006, 27, 3964-3970 [online], May 17, 2006 [retrieved on Jun. 26, 2012]. Retrieved from the Internet, URL: http://www3.nd/edu/~changlab/documents/pump-spray.pdf.
(Continued)

*Primary Examiner* — Constantine Hannaher
*Assistant Examiner* — Meenakshi Sahu
(74) *Attorney, Agent, or Firm* — Waters Technologies Corporation

(57) ABSTRACT

An electrokinetic pump can be used to deliver calibrant ("lock mass") ions to a mass spectrometer for calibration of a mass spectrometry system. Electrokinetically controlled calibrant delivery can help to eliminate the need for the more cumbersome mechanisms that are often used for ion delivery. In addition, electrokinetically controlled calibrant delivery can provide for a more user-friendly system in which a calibrant solution can be packaged into a disposable cartridge. Furthermore, when implemented in a microfluidic format, electrokinetically controlled calibrant delivery can be coupled with an electrokinetically controlled separation system, such as capillary electrophoresis (CE), to allow efficient solid-state switching between analytical and calibrant sprays.

16 Claims, 4 Drawing Sheets

(51) Int. Cl.
*H01J 49/00* (2006.01)
*H01J 49/04* (2006.01)

(56) References Cited

U.S. PATENT DOCUMENTS

| | | | | |
|---|---|---|---|---|
| 6,690,006 | B2 | 2/2004 | Valaskovic | |
| 6,803,568 | B2 * | 10/2004 | Bousse et al. | 250/288 |
| 2002/0000516 | A1 | 1/2002 | Schultz et al. | |
| 2002/0117629 | A1 | 8/2002 | Fujimaki et al. | |
| 2002/0190204 | A1 | 12/2002 | Hofstadler | |
| 2003/0146377 | A1 | 8/2003 | Miller et al. | |
| 2003/0224531 | A1 | 12/2003 | Brennen et al. | |
| 2004/0166504 | A1 | 8/2004 | Rossier et al. | |
| 2005/0072915 | A1 * | 4/2005 | Stults et al. | 250/288 |
| 2007/0057179 | A1 | 3/2007 | Bousse et al. | |
| 2007/0145263 | A1 | 6/2007 | Weng | |
| 2010/0075428 | A1 | 3/2010 | Wang | |

OTHER PUBLICATIONS

PCT International Search Report for PCT/US2012/28155, date of mailing Jul 2, 2012, 4 pages.

PCT International Written Opinion Report for PCT/US2012/28155, date of mailing Jul. 2, 2012, 4 pages.

Chambers et al. "Monolithic Integration of Two-Dimensional Liquid Chromatography-Capillary electrophoresis and Electrospray Ionization on a Microfluidic Device", Analytical Chemistry, 2011, 83:842-849.

Charles L. "Flow injection of the lock mass standard for accurate mass measurement in electrospray ionization time-of-light mass spectrometry coupled with liquid chromatogsaphy", Rapid Communications in Mass Spectrometry, 2003, 17:1383-1388.

Dayon et al. "Multitrack electrospray chips," Journal of Mass Spectrometry, 2006, 41:1484-1490.

Flora et al. "High-Mass Accuracy of Product Ions Produced by SORI-CID Using a Dual Electrospray Ionization Source Coupled with FTICR Mass Spectrometry," Anal. Chem., 2001, 73:1247-1251.

Hardenborg et al. "Novel polyamine coating providing non-covalent deactivation and reversed electroosmotic flow of fused-silica capillaries for capillary electrophoresis", Journal of Chromatography A., 1003 (2003), 217-221.

Jiang et al. "Development of Multi-ESI-Sprayer, Multi-Atmospheric-Pressure-inlet Mass Spectrometry and Its Application to Accurate Mass Measurement Using Time-of-Flight Mass Spectrometry," Anal. Chem., 2000, 72, 20-24.

Kelly et al. "Array of Chemically Etched Fused-Silica Emitters for Improving the Sensitivity and Quantitation of Electrospray Ionization Mass Spectrometry," Anal. Chem., 2007, 79:4192-4198.

Mellors et al. "A Microfabricated Device for Performing Comprehensive Online LC-CE-MS For Proteomics Applications," Twelfth International Conference on Miniaturized Systems for Chemistry and Life Sciences, Oct. 12-16, 2008, San Diego, California, USA, 1937-1939.

Prudent et al. "Microfabricated Dual Sprayer for On-Line Mass Tagging of Phosphopeptides," Anal. Chem. 2008, 80:2531-2538.

Rulison et al. "Scaleup of electrospray atomization using linear arrays of Taylor cones," Review of Scientific Instruments, 64, 683-686, (1993).

Satomi et al. "Accurate mass measurement in nane-electrospray ionization mass spectrometry by alternate switching of high voltage between sample and reference sprayers," Rapid Communications In Mass Spectrometry, 2005, 19:540-546.

Schneider et al. "Multiple sprayer system for high-throughput electrospray ionization mass spectrometry," Rapid Communications In Mass Spectrometry, 2002, 16:1982-1990.

Zhou et al. "High accuracy mass measurement of peptides with internal calibration using a dual electrospray ionization sprayer system for protein identification," Rapid Communications in Mass Spectrometry, 2002, 16:505-511.

Mellors et al. "Fully Integrated Glass Microfluidic Device for Performing High-Efficiency Capillary Electrophoresis and Electrospray Ionization Mass Spectrometry," Anal.Chem. 2008, 80:6881-6887.

* cited by examiner

ELECTROKINETICALLY CONTROLLED CALIBRANT DELIVERY

CROSS REFERENCE TO RELATED APPLICATIONS

This application is the National Stage of International Application No. PCT/US2012/028155, filed on Mar. 8, 2012, which claims priority to and benefit of U.S. Provisional Application No. 61/451,664, filed Mar. 11, 2011. The contents and teachings of each of these applications are hereby expressly incorporated herein by reference in their entirety.

TECHNICAL FIELD

This disclosure relates to electrokinetically controlled calibrant delivery.

BACKGROUND

Time-of-flight (TOF) mass spectrometers can suffer from mass accuracy drifting primarily due to thermal expansion/contraction of a flight tube of the mass spectrometer. To achieve improved mass accuracy, time-of-flight mass spectrometers often employ a regular calibration routine in which a calibrant substance of known mass ("lock mass") is introduced into the mass spectrometer at regular intervals, typically as often as every 30 seconds. In some known mass spectrometers, a mechanism (e.g., a mechanical baffle controlled by a stepper motor) is used to select effluent from either a calibrant electrospray stream or an analyte electrospray stream. These mechanisms generally operate by physically blocking effluent from one of the electrospray streams while effluent from the other electrospray stream is allowed to enter an inlet orifice of the mass spectrometer. Such mechanisms can be cumbersome and can introduce multiple points of mechanical failure. Such mechanisms can also inhibit optimal positioning of an analyte sprayer, which can result in reduced sensitivity. While it may be possible to simply turn off an actuating voltage to either of these spray sources while the other is spraying, the flow to these sprayers would likely continue resulting in a buildup of solution at the associated sprayer, which, in turn, could cause unstable spraying once the spay voltage is reapplied.

SUMMARY

One aspect provides a method that includes actuating an electrokinetic pump and thereby providing an electroosmotic flow of a calibrant solution from a calibrant solution source to an electrospray ionization emitter such that a plume of calibrant ions is emitted from the electrospray ionization emitter toward an inlet orifice of a mass spectrometer (e.g., a time-of-flight (TOF) mass spectrometer).

According to another aspect, a method includes alternately actuating a first electrokinetic pump and a second electrokinetic pump and thereby sequentially providing electroosmotic flows of an analyte solution and a calibrant solution from an analyte solution source and a calibrant solution source, respectively, to an analyte electrospray ionization emitter and a calibrant electrospray ionization emitter, respectively, such that separate plumes of analyte ions and calibrant ions are emitted from the analyte electrospray ionization emitter and the calibrant electrospray ionization emitter, respectively, toward an inlet orifice of a mass spectrometer.

In yet another aspect, a method includes applying a voltage to a microfluidic device and thereby delivering calibrant ions toward an inlet orifice of a mass spectrometer.

Implementations may include one or more of the following features.

In some implementations, a high voltage of about +100 volts to about_+10 kV (e.g., about +4.8 kV) is applied to an electrokinetic pump to actuate the electrokinetic pump. A source of calibrant solution can be held at ground potential while the high voltage is applied to the electrokinetic pump.

Actuating the electrokinetic pump can include applying a high voltage to the electrokinetic pump for a plurality of discrete time intervals. Each time interval can be about 1 second to about 30 seconds (e.g., about 2 seconds).

In some cases, actuating the electrokinetic pump includes alternating a voltage applied to the electrokinetic pump. For example, the applied voltage may be alternated between an off state of about 0 kV and an on state of about +100 volts to about +10 kV (e.g., about +4.8 kV).

In some implementations, the calibrant solution source includes a reservoir operably connected to the electrokinetic pump.

Methods may also include positioning a tip of an electrospray ionization emitter about 5 mm from an inlet orifice of the mass spectrometer.

In some implementations, alternately actuating the first electrokinetic pump and the second electrokinetic pump includes applying voltage to the first and second electrokinetic pumps. The applied voltage may be alternated between an off state of about 0 kV and an on state of about +100 volts to about +10 kV (e.g., about +4.8 kV).

In some cases, the time required to switch from the delivery analyte ions to the delivery of calibrant ions, and vice versa, is less than 200 milliseconds, e.g., less than 50 milliseconds, e.g., less than 33 milliseconds.

The analyte solution may be effluent from a liquid chromatography column.

In some implementations, the microfluidic device includes an electrokinetic pump, and the applied voltage to the microfluidic device actuates the electrokinetic pump, thereby delivering calibrant ions toward a mass spectrometer. In some examples, the electrokinetic pump is actuatable to provide an electroosmotic flow of a calibrant solution from a calibrant solution source to an electrospray ionization emitter such that a plume of the calibrant ions is emitted from the electrospray ionization emitter toward the inlet orifice of the mass spectrometer.

The calibrant solution source may be a reservoir mounted to the microfluidic device.

In some cases, the electrokinetic pump is operably connected to a calibrant electrospray ionization emitter, and actuation of the electrokinetic pump causes the calibrant electrospray ionization emitter to emit a plume of the calibrant ions.

The microfluidic device may include a first electrokinetic pump operably connected to an analyte electrospray ionization emitter and a second electrokinetic pump operably connected to a calibrant electrospray ionization emitter. Applying the voltage to the microfluidic device may include alternately applying voltage to the first electrokinetic pump and the second electrokinetic pump and thereby sequentially actuating the first electrokinetic pump and the second electrokinetic pump. Actuation of the first electrokinetic pump causes the analyte electrospray ionization emitter to emit a plume of analyte ions toward the inlet orifice of the mass spectrometer, and actuation of the second electrokinetic pump causes the calibrant electrospray ionization emitter to emit a plume of the calibrant ions.

The analyte solution source can include an analyte reservoir that is supported on the microfluidic device, and wherein the calibrant solution source is a calibrant reservoir supported on the microfluidic device.

Alternatively or additionally, the analyte solution source can include a liquid chromatography column.

Implementations can provide one or more of the following advantages.

In some implementations, the coupling of electrokinetically controlled calibrant delivery with an electrokinetically controlled separation system, such as capillary electrophoresis (CE), can allow for efficient solid-state switching between analytical and calibrant sprays.

Electrokinetically controlled calibrant delivery can be utilized as an alternative to more cumbersome mechanisms.

Other aspects, features, and advantages are in the description, drawings, and claims.

BRIEF DESCRIPTION OF THE DRAWINGS

Like reference numbers indicate like elements.

DETAILED DESCRIPTION

An electrokinetic pump can be used to deliver calibrant ("lock mass") ions to a mass spectrometer for calibration of a mass spectrometry system. Electrokinetically controlled calibrant delivery can help to eliminate the need for the more cumbersome mechanisms that are often used for ion delivery. In addition, electrokinetically controlled calibrant delivery can provide for a more user-friendly system in which a calibrant solution can be packaged into a disposable cartridge. Furthermore, when implemented in a microfluidic format, electrokinetically controlled calibrant delivery can be coupled with an electrokinetically controlled separation system, such as capillary electrophoresis (CE), to allow efficient solid-state switching between analytical and calibrant sprays.

Figure 1:
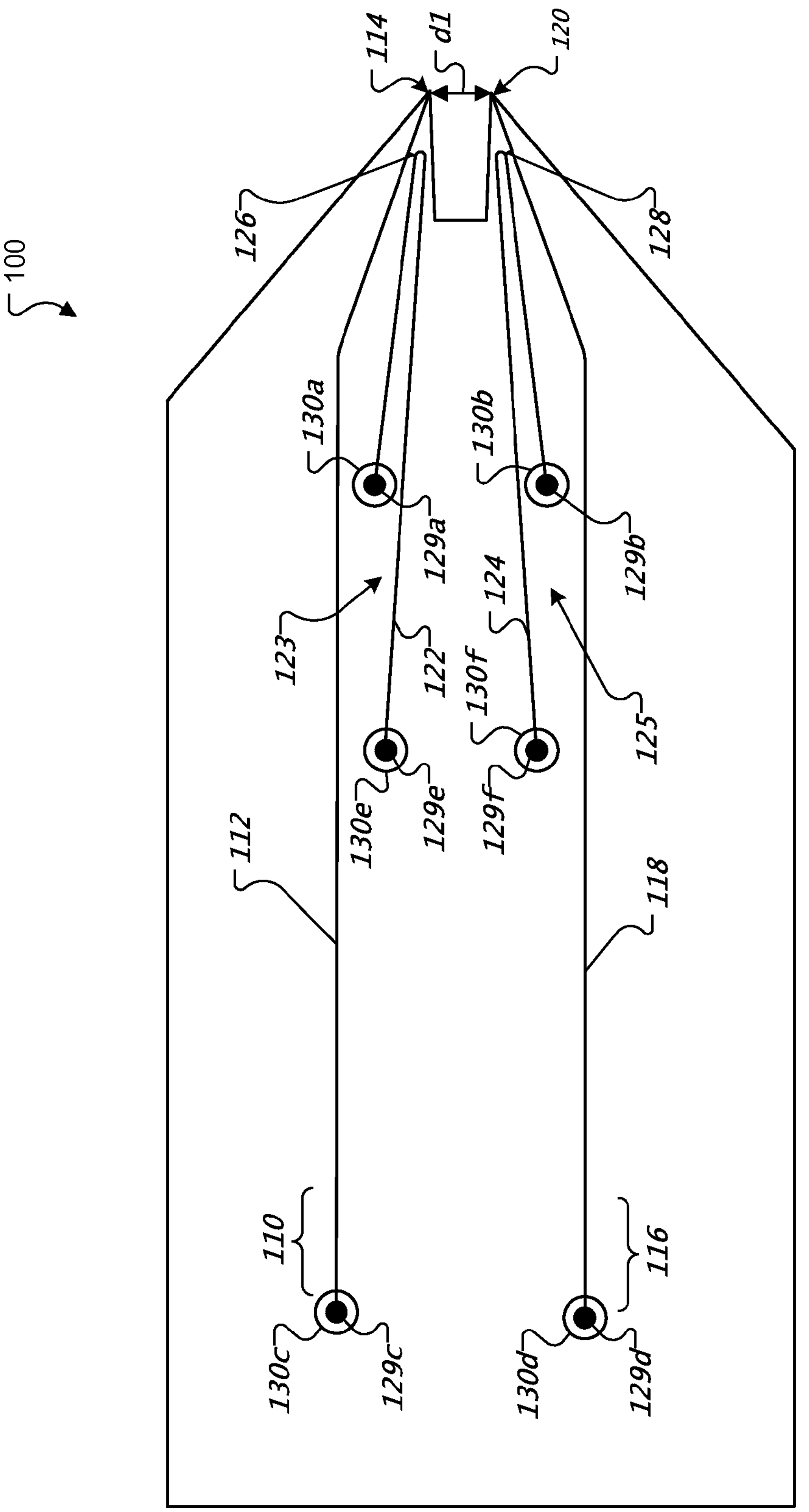
FIG. 1 is a plan view of a microfluidic electrospray device.

FIG. 1 shows an exemplary microfluidic electrospray device 100 that can be utilized to introduce ions of a known mass into a mass spectrometer, via electrokinetic pumping, for calibration of a mass spectrometry system. The microfluidic electrospray device 100 includes a glass substrate (e.g., borosilicate glass) having a plurality of microchannels. The microchannels include an analyte channel 110 that is connected to a first transfer channel 112, which terminates at an analyte electrospray ionization (ESI) emitter 114. The microchannels also include a calibrant channel 116 that is connected to a second transfer channel 118, which terminates at a calibrant ESI emitter 120. The distance dl between the tips of the analyte and calibrant ESI emitters 114, 120 can be about 3.6 mm. The microchannels also include U-shaped electrokinetic pump channels 122, 124, which help to define the electrokinetic pumps 123, 125. The first electrokinetic pump channel 122 is connected to the first transfer channel 112 via a first nanojunction 126. Similarly, the second electrokinetic pump channel 124 is connected to the second transfer channel 118 via a second nanojunction 128.

The microchannels can be formed in a 150 μm thick, glass substrate layer using standard photolithography, wet-chemical etching procedures. The depth and width of the channels can be 8 μm and 60 μm, respectively. The analyte channel 110 and the calibrant channel 116 can each have a length of about 5 mm. The first and second transfer channels can each have a length of about 42 mm. The first and second, U-shaped electrokinetic pump channels 122, 124 can each have a length of about 12 mm. The first and second nanojunctions 126, 128 can be formed by focused ion beam milling to connect a gap (e.g., a 75 μm gap) between each of the associated pump and transfer channels. The first and second nanojunctions 126, 128 can have a depth of about 50 nm and a width of about 50 μm. The surfaces of all channels except the electrokinetic pump channels can be coated with a polyamine such as PolyE-323. PolyE-323 adheres to glass surfaces through electrostatic and hydrogen bonding forces to provide stable anodic (reversed) electroosmotic flow when using a neutral to acid background electrolyte.

Access ports 129*a-f* can be powder blasted, through the first glass substrate, at the termini of the analyte, calibrant, and pump channels 110, 116, 122, 124 to provide access to the channels, and a blank substrate layer can be fusion bonded to the etched substrate to enclose the channels. An associated reservoir 130*a-f* can be mounted, e.g., with epoxy, at each access port 129*a-f*. The reservoirs 130*a-f* can be cylindrical with open, opposite ends. Each of the reservoirs 130*a-f* can include an electrode for electrical contact. The tips of ESI emitters 114, 120 can be machined by dicing the bonded microchip with a precision dicing saw such that the transfer channels 112, 118 terminate at approximately 50° edges. The exterior surface of the tips of the ESI emitters 114, 120 can be coated with a perfluorooctylsilane to make the surface hydrophobic to prevent wetting.

Figure 2:
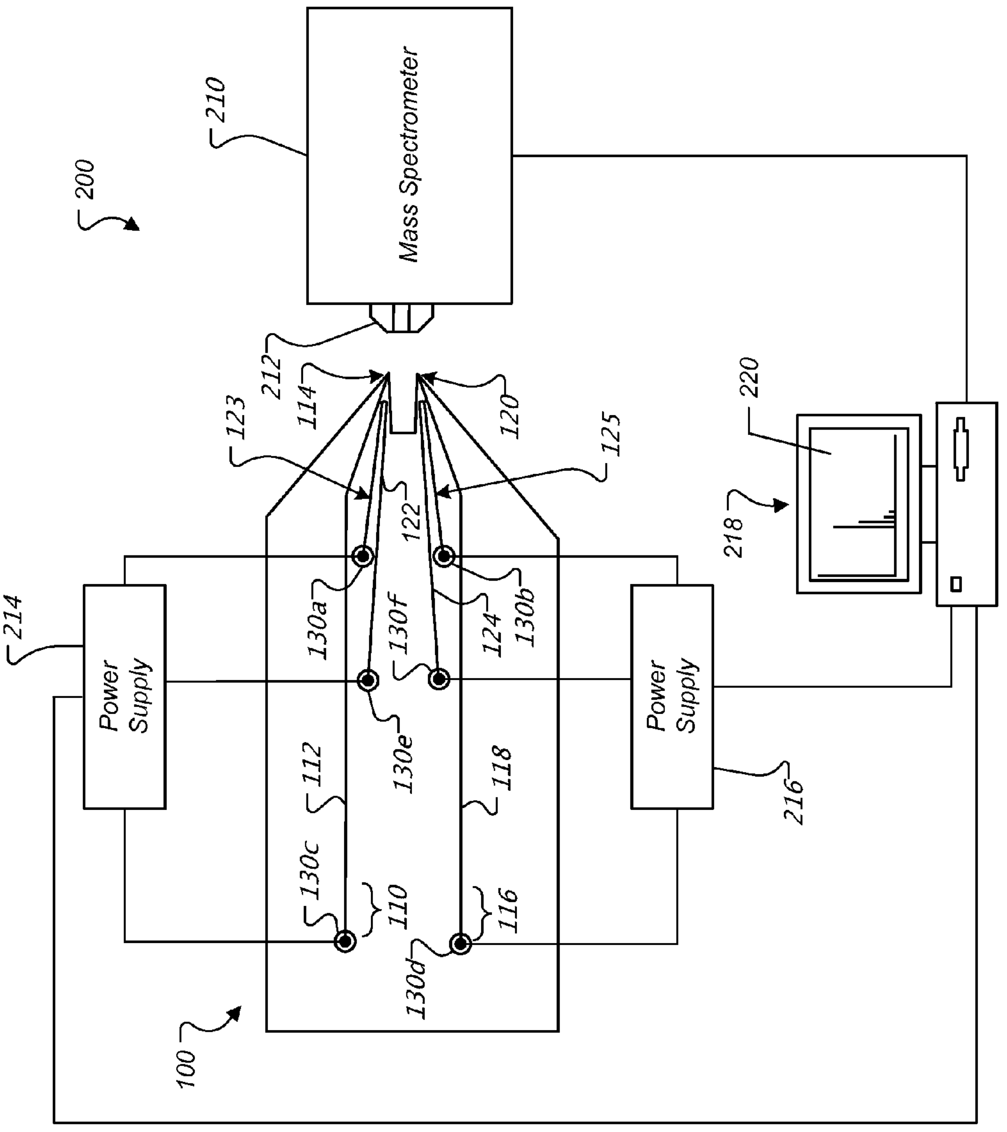
FIG. 2 is a schematic view of a mass spectrometry system including the microfluidic electrospray device of FIG. 1.

A microfluidic electrospray device with this configuration can be used for introducing a calibrant solution (lock mass) into a mass spectrometer of a mass spectrometry system for calibration of the system. For example, FIG. 2 illustrates a mass spectrometry (MS) system 200 that allows a calibrant solution (lock mass) to be introduced using an electrokinetically driven pump. Referring to FIG. 2, the MS system 200 includes the microfluidic electrospray device 100 and a mass spectrometer 210. The microfluidic electrospray device is positioned such that ions emitted from the analyte and calibrant ESI emitters 114, 120 are taken into the mass spectrometer 210 via an inlet orifice 212.

The mass spectrometer 210 is wired to a computer system 218, which can record an electrical signal that can be used to generate an ion chromatogram on a display 220. The mass spectrometer 210 can include a quadrupole, a time-of-flight (TOF), or a hybrid (e.g., a quadrupole time-of-flight (QTOF)). Suitable analyzers include the QTof Micro and LCT Premier™, available from Waters Corporation, Milford, Mass.

First and second power supplies 214, 216 are in electrical communication with the microfluidic electrospray device 100 and are operable to control activation of the first and second electrokinetically driven pumps, respectively. Suitable power supplies include model no. 2866A from Bertan High Voltage Corp. of Hicksville, N.Y., having voltage rise and fall times of approximately 5 milliseconds. The first and second power supplies 214, 216 are computer-controlled via the computer system 218. In this regard, the computer system 218 can include an analog output board, such as part no. PCI-6713 from National Instruments of Austin, Tex., and software, such as LabVIEW version 8.5 from National Instruments, for controlling operation of the first and second power supplies 214, 216.

In operation, the microfluidic electrospray device 100 is arranged such that the tips of the ESI emitters 114, 120 are positioned approximately 5 mm from the plane of the inlet orifice 212, and such that both the analyte ESI emitter 114 and the calibrant ESI emitter 120 are aligned an equal distance (e.g., about 1.8 mm) from the axis of the inlet orifice 212. Then, electric potential is applied sequentially (e.g., at 2 second intervals) to the first and second electrokinetically driven pumps 123, 125 via the first and second power supplies 214, 216, respectively. In this regard, a high voltage, of several kilovolts in some cases, can be alternately applied to the electrokinetic pump reservoirs 130*a*, 130*b* that are located closer to the tips of the ESI emitters 114, 120, while the other electrokinetic pump reservoirs 130*e* and 130*f* are held at ground. The voltages applied to the pump reservoirs 130*a*, 130*b* during the sequential "off" and "on" states can be about 0 kV and about +4 kV, respectively.

While the voltage is alternately applied to the pump reservoirs 130*a*, 130*b*, the analyte and reference reservoirs 130*c*, 130*d* can be held at ground so that analyte solution and calibrant solution are delivered from the reservoirs 130*c* and 130*d* toward the first and second electrokinetically driven pumps 123, 125, respectively. Alternatively, the analyte solution and/or the reference solution may be delivered toward the electrokinetically driven pumps via some other means, such as by one or more mechanical pumps attached (e.g., upstream) to analyte reservoir 130*c* and/or the reference reservoir 130*d*.

Positively charged surfaces of the PolyE-323 coated transfer channels 112, 118 and negatively charged surfaces of the electrokinetic pump channels 122, 124 result in electroosmotic flow toward the nanojunctions 126, 128. This creates a pressure increase in the vicinity of the nanojunctions 126, 128 that forces the respective fluids out of the analyte and calibrant ESI emitters 114, 120. The voltage applied to the electrokinetic pumps 123, 125 generates both the electroosmotic flow and electrospray ionization potential. Ions from the analyte and calibrant ESI emitters 114, 120 are then collected by the mass spectrometer 210, which detects analyte and calibrant ion signals, and the MS system 200 can then calibrated based on the detected calibrant ion signal.

Alternating the analyte and calibrant ion flows (i.e., via sequential operation of the first and second electrokinetic pumps) allows the mass spectrometer to detect analyte and calibrant ion signals separately of each other. This allows an analyte spectrum and a calibrant mass spectrum to be generated separately, and can help to avoid issues such as ion suppression, mass interference, and solvent effects.

A unique aspect of the electrokinetically driven flow is that it can be stopped and started very quickly by simply interrupting the electric field used to drive the flow. In some cases, the time required to switch between electrospray signals is less than 200 milliseconds (ms), e.g., less than 50 ms, e.g., less than 33 ms. As the high voltage of about +100 volts to about +10 kV (e.g., +4.8 kV) is applied, the corresponding ESI emitter 114, 120 immediately recovers from an "off" state deliver an electrospray plume. When the applied voltage is switched to 0 kV, the fluid flow stops immediately, inhibiting droplet formation at the tip of the corresponding ESI emitter 114, 120. Because of this, electrokinetically driven flow can be used very effectively to deliver calibrant to the mass spectrometer for system calibration.

Figure 3:
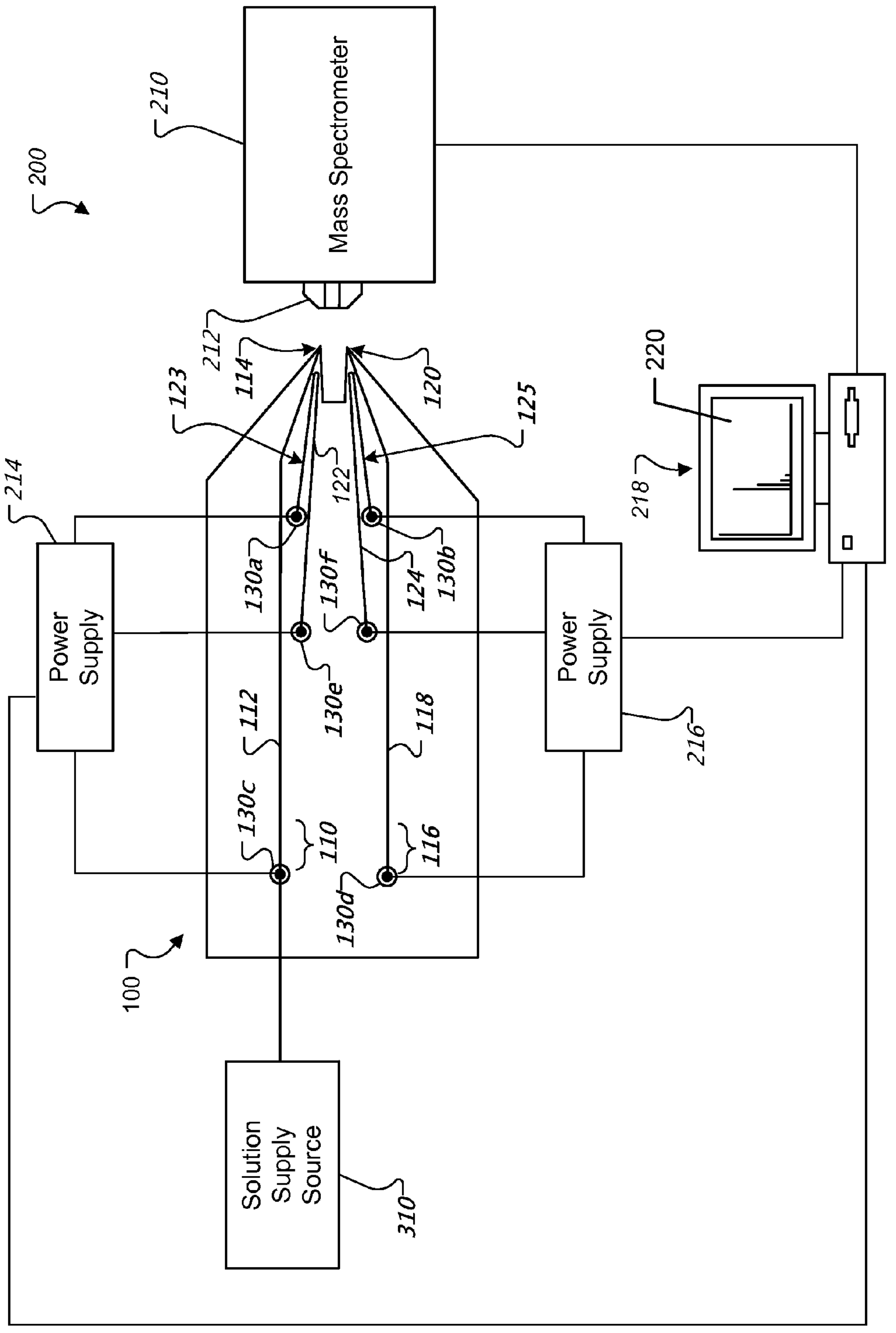
FIG. 3 is a schematic view of a mass spectrometry system including an analyte solution supply source in communication with the microfluidic electrospray device of FIG. 1.

Although a few implementations have been described in detail above, other modifications are possible. For example, with reference to FIG. 3, in some implementations, the analyte reservoir 130*c* may be in fluid communication with a solution supply source 310, such as a liquid chromatograph (LC). The solution supply source 310 can provide a sample fluid, such as an LC effluent from an LC column, to the analyte reservoir 130*c*.

Figure 4:
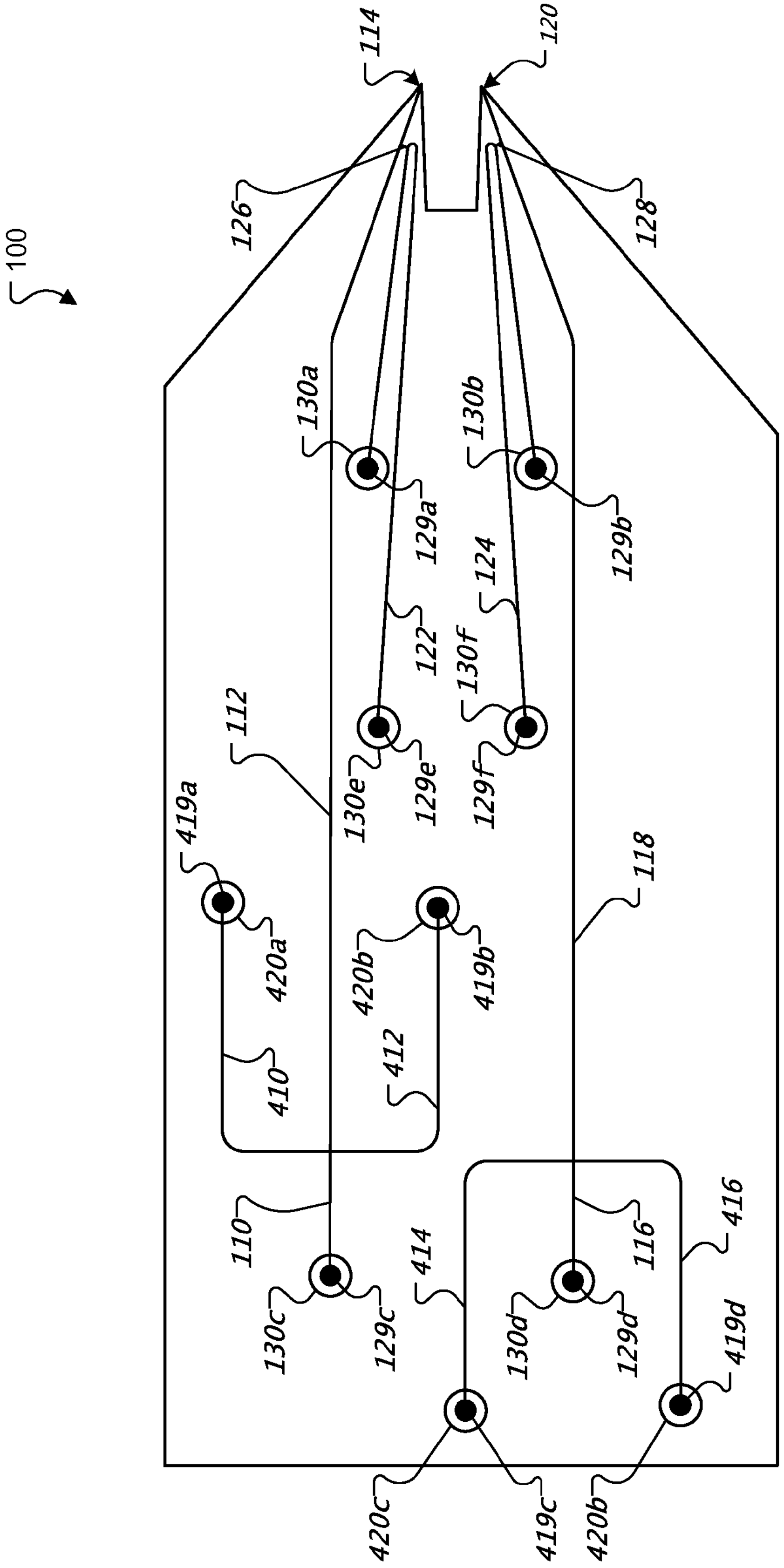
FIG. 4 is a plan view of a microfluidic electrospray device including buffer and waste microchannels.

In certain implementations, the microfluidic electrospray device may have one or more additional channels. For example, FIG. 4 illustrates an implementation of the microfluidic electrospray device 100 that includes additional buffer channels and waste channels. A first buffer channel 410 and a first waste channel 412 are connected, in fluid communication, at the junction of the analyte channel 110 and the first transfer channel 112. Similarly, a second buffer channel 414 and a second waste channel 416 are connected, in fluid communication, at the junction of the calibrant channel 116 the second transfer channel 118. The buffer channels 410, 414 and the waste channels 412, 416 can each have a depth and width of 8 μm and 60 μm, respectively. The buffer channels 410, 414 and the waste channels 412, 416 can each have a length of about 14 mm. Additional access ports 419*a-d* can be provided at the termini of the buffer channels 410, 414 and the waste channels 412, 416 to provide access to those channels. And, an additional reservoir 420*a*-420*d* with an electrode for electrical connection can be provided at each of the additional access ports 419*a-d*.

In some instances, the first transfer channel 112 can be used as a separation channel (e.g., for electrochromatographic or electrophoretic separations). The first buffer reservoir 410 can hold an ionic buffer or mobile phase. Voltages at the various reservoirs can be adjusted to control flows of analyte, buffer or mobile phase, and calibrant solution.

Accordingly, other implementations are within the scope of the following claims.

What is claimed is:

1. A method comprising:

actuating an electrokinetic pump for a plurality of discrete time intervals by alternating a voltage applied to a calibrant solution source and an analyte solution source of the electrokinetic pump and thereby providing an electroosmotic flow of a calibrant solution from the calibrant solution source to an electrospray ionization emitter such that a plume of calibrant ions is emitted from the electrospray ionization emitter toward an inlet orifice of a mass spectrometer at discrete time intervals.

2. The method of claim 1, wherein actuating the electrokinetic pump comprises applying a high voltage to the electrokinetic pump.

3. The method of claim 2, wherein the high voltage is about +100 volts to about +10 KV.

4. The method of claim 2, further comprising holding a source of calibrant solution at ground potential.

5. The method claim 1, wherein actuating the electrokinetic pump comprises applying a high voltage to the electrokinetic pump for the plurality of discrete time intervals.

6. The method of claim 1, wherein the applied voltage is alternated between an off state of about 0 kV and an on state of about +100 volts to about +10 kV.

7. The method of claim 1, wherein the calibrant solution source comprises a reservoir operably connected to the electrokinetic pump.

8. The method of claim 1, further comprising positioning a tip of the electrospray ionization emitter, relative to an inlet orifice of the mass spectrometer, such that a signal within 50% of optimal is achieved on the mass spectrometer.

9. The method of claim 1, further comprising positioning a tip of the electrospray ionization emitter, relative to an inlet orifice of the mass spectrometer, such that an optimal signal is achieved on the mass spectrometer.

10. The method of claim 1, wherein the mass spectrometer is a time-of-flight (TOF) mass spectrometer.

11. A method comprising applying a voltage to a microfluidic device for a plurality of alternating intervals to provide an electroosmotic flow of a calibrant solution from a calibrant solution source and an analyte solution from an analyte solution source and thereby delivering calibrant ions toward an inlet orifice of a mass spectrometer at discrete time intervals.

12. The method of claim 11, wherein the microfluidic device comprises an electrokinetic pump, and wherein the applied voltage actuates the electrokinetic pump thereby delivering calibrant ions toward a mass spectrometer.

13. The method of claim 12, wherein the electrokinetic pump is actuatable to provide an electroosmotic flow of the calibrant solution from the calibrant solution source to an electrospray ionization emitter such that a plume of the calibrant ions is emitted from the electrospray ionization emitter toward the inlet orifice of the mass spectrometer.

14. The method of claim 13, wherein the calibrant solution source is a reservoir mounted to the microfluidic device.

15. The method of claim 12, wherein the electrokinetic pump is operably connected to a calibrant electrospray ionization emitter, and wherein actuation of the electrokinetic pump causes the calibrant electrospray ionization emitter to emit a plume of the calibrant ions.

16. The method of claim 11, wherein the mass spectrometer is a time-of-flight (TOF) mass spectrometer.

* * * * *